US012798287B2

(12) United States Patent
Street et al.

(10) Patent No.: US 12,798,287 B2
(45) Date of Patent: Nov. 17, 2026

(54) UTILITY VEHICLE WITH OMNIDIRECTIONAL WHEELS

(71) Applicant: THE TORO COMPANY, Bloomington, MN (US)

(72) Inventors: Benjamin Allan Street, Northfield, MN (US); Brandon John Anderson, Savage, MN (US)

(73) Assignee: THE TORO COMPANY, Bloomington, MN (US)

( * ) Notice: Subject to any disclaimer, the term of this patent is extended or adjusted under 35 U.S.C. 154(b) by 1148 days.

(21) Appl. No.: 17/874,990

(22) Filed: Jul. 27, 2022

(65) Prior Publication Data

US 2023/0041236 A1 Feb. 9, 2023

Related U.S. Application Data

(60) Provisional application No. 63/229,909, filed on Aug. 5, 2021.

(51) Int. Cl.
*B60B 19/00* (2006.01)
*E02F 3/36* (2006.01)

(52) U.S. Cl.
CPC .............. *B60B 19/003* (2013.01); *E02F 3/36* (2013.01)

(58) Field of Classification Search
CPC ....... B60B 19/003; B60B 19/00; B60B 19/12; B60B 19/125; E02F 3/36; E02F 3/3414; E02F 9/02; E02F 9/205; A01G 23/067
USPC .......................................................... 180/710
See application file for complete search history.

(56) References Cited

U.S. PATENT DOCUMENTS 5,323,867 A * 6/1994 Griffin ................. B25J 11/0025 180/22
7,980,569 B2 7/2011 Azure et al.
9,221,506 B1 * 12/2015 Georgeson ............... B25J 5/007
9,242,508 B2 1/2016 Bando et al.
9,436,207 B2 9/2016 Fukuoka et al.
9,573,416 B1 2/2017 Niemeyer et al.
9,864,396 B1 1/2018 Brown et al.
(Continued)

FOREIGN PATENT DOCUMENTS

KR 102197062 B1 * 12/2020 ........... B60B 19/125
WO WO-2016177806 A1 * 11/2016 ........... B60K 17/356

OTHER PUBLICATIONS

Merged document of foreign patent above to include translation (Year: 2020).*
(Continued)

*Primary Examiner* — Valentin Neacsu
*Assistant Examiner* — Abigail R Hymel
(74) *Attorney, Agent, or Firm* — Mueting Raasch Group

(57) ABSTRACT

A utility vehicle having an omnidirectional wheel on one side of one or both of a front end of the vehicle and a rear end of the vehicle. The vehicle including a frame carrying a prime mover, the frame having the front and the rear end spaced apart along a longitudinal axis. The frame further having left and right sides spaced apart along a transverse axis. The vehicle including ground engaging member operatively attached to the frame and carrying the frame above a ground surface. The ground engaging member include an omnidirectional wheel and a conventional wheel, both nearest the front end and/or rear end of the frame on opposite sides of the frame.

20 Claims, 6 Drawing Sheets

(56) References Cited

U.S. PATENT DOCUMENTS

| | | | | |
|---|---|---|---|---|
| 2010/0140888 | A1* | 6/2010 | McKinnon | B62B 1/10 280/47.21 |
| 2012/0279830 | A1* | 11/2012 | Reidhaar | B65G 39/00 198/780 |
| 2019/0126675 | A1* | 5/2019 | Zhang | B60B 19/003 |
| 2020/0039288 | A1 | 2/2020 | Hirata et al. | |

OTHER PUBLICATIONS

Merriam-Webster Dictionary, Opposite definition 1a (Year: 2026).*
Brochure for Personal Electric Vehicles, "Model A, Personal Mobility" Whill, Inc., San Carlos, CA, Oct. 2017; 4 pages.

* cited by examiner

UTILITY VEHICLE WITH OMNIDIRECTIONAL WHEELS

The present application claimed priority to and/or the benefit of U.S. Provisional Patent Application No. 63/229,909, filed Aug. 5, 2021, which is incorporated herein by reference in its entirety.

Embodiments of the present disclosure relate to utility vehicles (such as, e.g., compact utility loaders) having omnidirectional wheels.

BACKGROUND

Utility vehicles (e.g., such as compact utility loaders) are known for performing various types of work in an outdoor or indoor environment. While able to perform the types of work often associated with large skid steer loaders, compact utility loaders are generally smaller in size. Furthermore, some utility vehicles may be controlled by a stand-on or walk-behind operator (e.g., such loaders may be referred to as "SOWB" loaders) and, therefore, do not carry an operator in a seated position as do larger skid steer loaders. Instead, they are most often operated by an operator who stands on a platform attached to the rear of the vehicle or, alternatively, walks on the ground behind the vehicle.

In some embodiments, utility vehicles may employ a differential drive and steering system in which drive members (e.g., wheels) on opposite (left and right) sides of the vehicle may be driven at different speeds and/or in opposite directions. When the drive members are driven at different speeds and in the same direction, the vehicle will execute a turn towards the side of the slowest drive member. When the drive members are driven at the same speed but in opposite directions, the vehicle will execute a very sharp spin or zero radius turn about a vertical axis located between the drive members. This is accomplished using separate traction drives (e.g., individual hydrostatic transmissions) to independently power the left and right drive members. Dual traction or drive control levers are often used to independently control the traction drives. These control levers are pivotal in fore-and-aft directions from a neutral position in which the traction drives are unpowered and the vehicle is stationary. When the levers are equally pushed forwardly from neutral, the vehicle will move forwardly in a straight line at a speed proportional to the distance that the levers have been moved. Similarly, when the levers are equally pulled rearwardly from neutral, the vehicle will move rearwardly in a straight line at a speed proportional to the distance that the levers have been moved rearwardly. Again, by independently moving the two control levers, turns of varying degrees may be accommodated. In yet other embodiments, the utility vehicle may include a joystick that is manipulated forward and back to move the vehicle accordingly, and twisted or moved to the side to turn the vehicle through drive differential.

Moreover, utility vehicles may include various ground engaging members or wheels that carry the vehicle over the ground surface and propel the vehicle across the ground surface. The wheels of the vehicle may be limited regarding turns due to the singular rotational axis upon which the wheels rotate. In other words, during turns, the wheels of the vehicle may slip or skid, thereby creating added friction, causing increased power consumption on the wheels.

Modern utility vehicles are able to accept a variety of working tool attachments that attach to a boom extending from a frame of the vehicles. The boom is typically formed by one or more lift arms that extend forward from the vehicle and include a mounting structure capable of receiving and supporting the attachment. The lift arms are typically pivotally attached to the vehicle and, via an actuator such as one or more hydraulic cylinders, may be pivoted relative to the vehicle such that the elevation of the attachment may be varied. In some utility vehicles, the mounting structure may also pivot, relative to the lift arms, to adjust the orientation of the attachment relative to the lift arms.

SUMMARY

Embodiments of the present disclosure may provide a utility vehicle that includes a frame carrying a prime mover. The frame may include a front end and a rear end spaced apart along a longitudinal axis of the utility vehicle. The frame may also include left and right sides spaced apart along a transverse axis. The utility vehicle also includes ground engaging members operatively attached to the frame and carrying the frame above a ground surface. At least one of the ground engaging members may be powered by the prime mover to propel the frame over the ground surface. The ground engaging members may include two omnidirectional wheels and two conventional wheels. The two omnidirectional wheels may be positioned opposite one another longitudinally and transversely. Each omnidirectional wheel of the two omnidirectional wheels may include a body portion and a plurality of rollers. The body portion may be adapted to rotate relative to the frame about a wheel axis. Each roller of the plurality of rollers may be adapted to rotate relative to the body portion about a roller axis. The roller axis of each roller may be separate from one another. Further, the utility vehicle may include a lift arm assembly operatively attached to the frame and a tool assembly carried on a front end of the lift arm assembly.

In another embodiment, a utility vehicle is provided that includes a frame carrying a prime mover. The frame may include a front end and a rear end spaced apart along a longitudinal axis of the utility vehicle. The frame may also include left and right sides spaced apart along a transverse axis. The utility vehicle also includes ground engaging members operatively attached to the frame and carrying the frame above a ground surface. At least one of the ground engaging members may be powered by the prime mover to propel the frame over the ground surface. The ground engaging members comprise an omnidirectional wheel and a conventional wheel, both nearest the rear end of the frame on opposite sides of the frame. The omnidirectional wheel may include a body portion and a plurality of rollers. The body portion may be adapted to rotate relative to the frame about a wheel axis. Each roller of the plurality of rollers may be adapted to rotate relative to the body portion about a roller axis. The roller axis of each roller may be separate from one another. Further, the utility vehicle may include a lift arm assembly operatively attached to the frame and a tool assembly carried on a front end of the lift arm assembly.

In yet another embodiment, a utility vehicle is provided that includes a frame carrying a prime mover. The frame may include a front end and a rear end spaced apart along a longitudinal axis of the utility vehicle. The frame may also include left and right sides spaced apart along a transverse axis. The utility vehicle also includes ground engaging members operatively attached to the frame and carrying the frame above a ground surface. At least one of the ground engaging members may be powered by the prime mover to propel the frame over the ground surface. The ground engaging members may include an omnidirectional wheel and a conventional wheel, both nearest the front end of the frame on opposite sides of the frame. The omnidirectional wheel may include a body portion and a plurality of rollers. The body portion may be adapted to rotate relative to the frame about a wheel axis. Each roller of the plurality of rollers may be adapted to rotate relative to the body portion about a roller axis. The roller axis of each roller may be separate from one another. Further, the utility vehicle may include a lift arm assembly operatively attached to the frame and a tool assembly carried on a front end of the lift arm assembly.

In another embodiment, a compact utility loader is provided that includes a frame carrying a prime mover. The frame may include a front end and a rear end spaced apart along a longitudinal axis of the utility vehicle. The frame may also include left and right sides spaced apart along a transverse axis. The compact utility loader also includes ground engaging members operatively attached to the frame and carrying the frame above a ground surface. At least one of the ground engaging members may be powered by the prime mover to propel the frame over the ground surface. The ground engaging members may include two omnidirectional wheels and two conventional wheels. The two omnidirectional wheels may be positioned opposite one another longitudinally and transversely. Each omnidirectional wheel of the two omnidirectional wheels may include a body portion and a plurality of rollers. The body portion may be adapted to rotate relative to the frame about a wheel axis. Each roller of the plurality of rollers may be adapted to rotate relative to the body portion about a roller axis. The roller axis of each roller may be separate from one another. Further, the compact utility loader may include a lift arm assembly operatively attached to the frame and a tool assembly carried on a front end of the lift arm assembly.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1A:
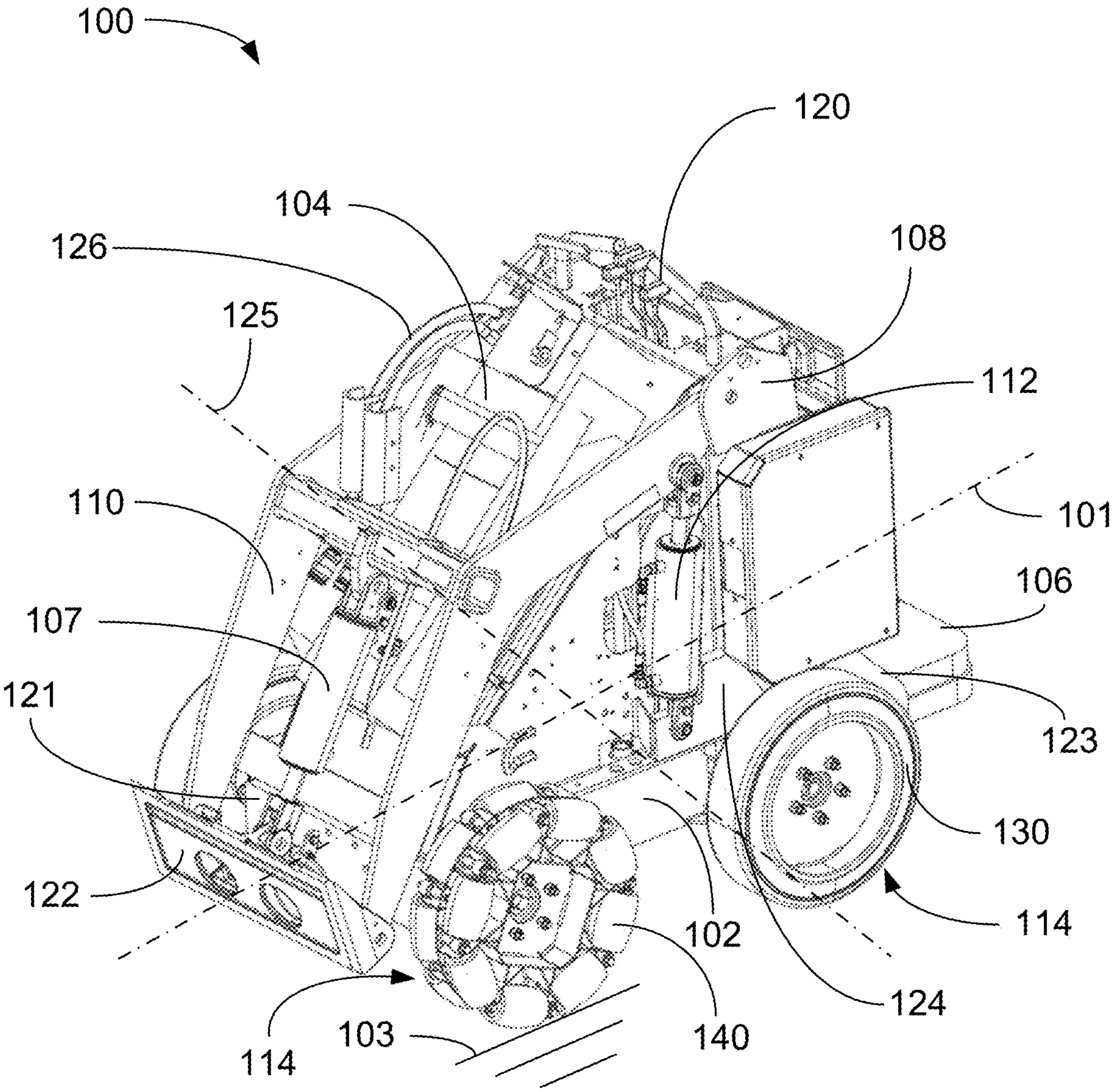
FIG. 1A is a front left perspective view of a utility vehicle with omnidirectional wheels in accordance with one embodiment of this disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Furthermore, the terms "comprises" and variations thereof do not have a limiting meaning where these terms appear in this description and claims, and the terms "a," "an," "the," "at least one," and "one or more" are used interchangeably herein.

Figure 1B:
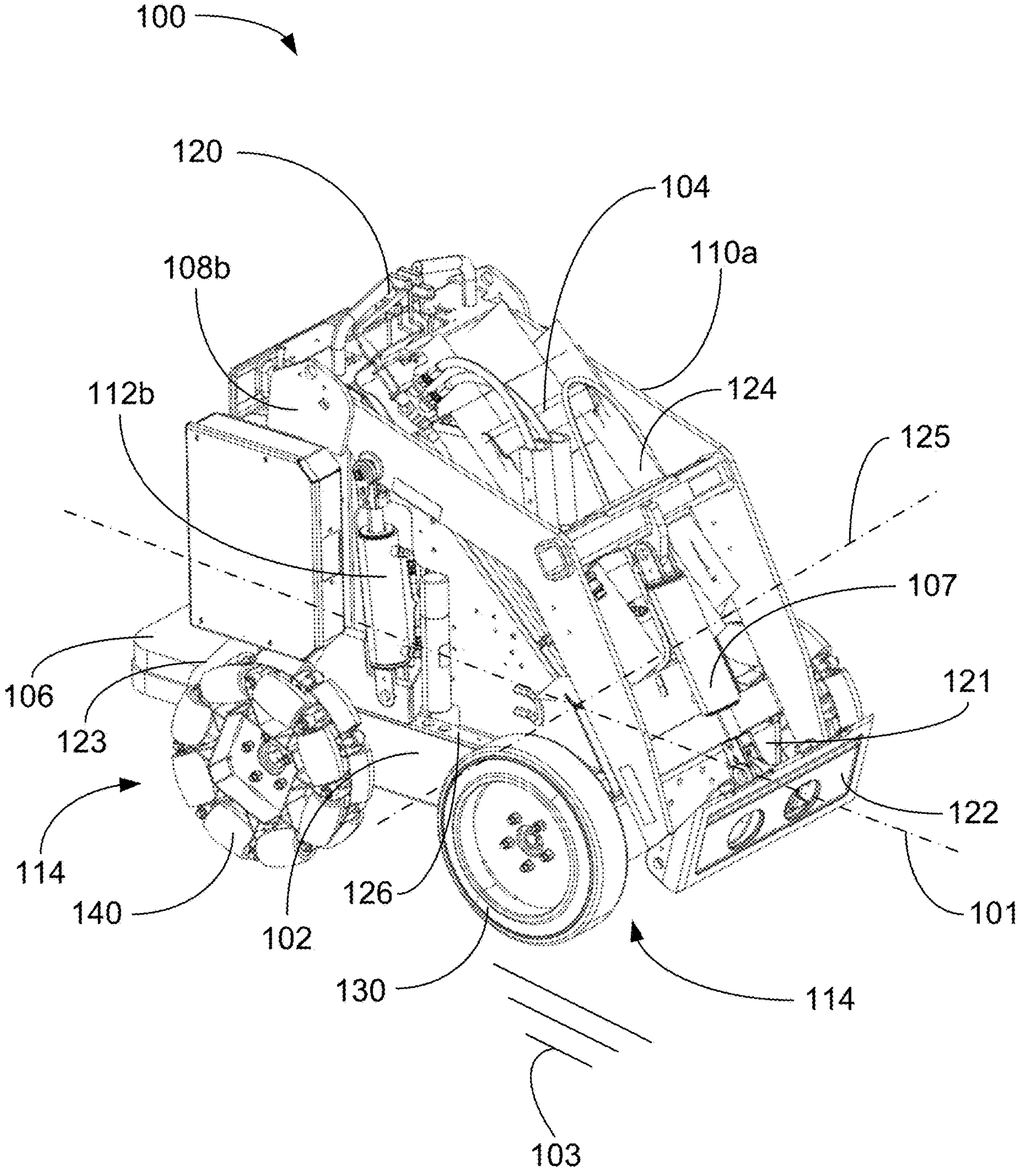
FIG. 1B is a front right perspective view of the utility vehicle of FIG. 1A.
Figure 1C:
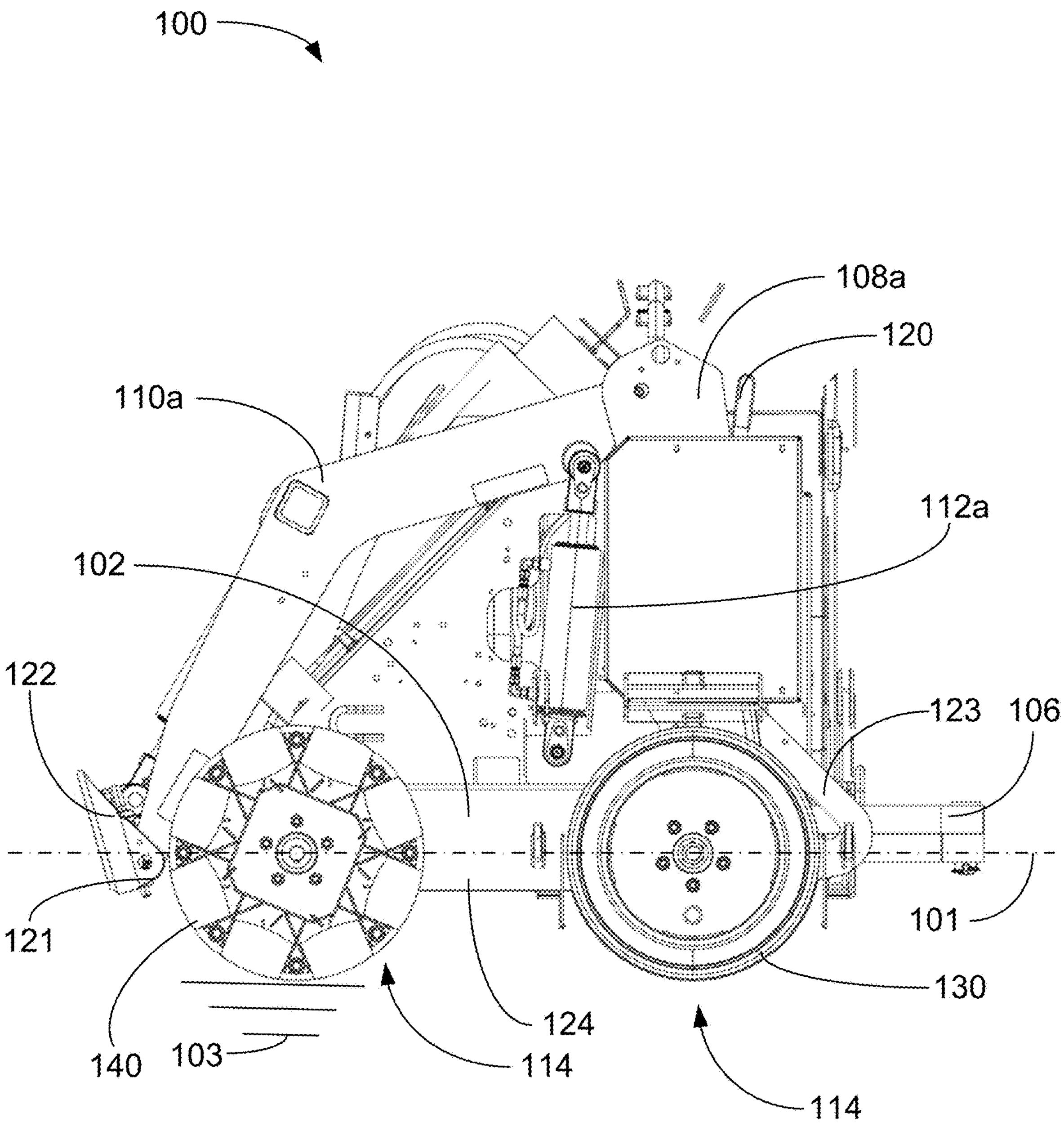
FIG. 1C is a left side elevation view of the utility vehicle of FIG. 1A.

Still further, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the vehicle 100 while the vehicle is in an operating configuration, e.g., while it is positioned such that wheels rest upon a generally horizontal ground surface 103 as shown in FIGS. 1A-1C. These terms are used only to simplify the description, however, and not to limit the interpretation of any embodiment described.

Embodiments described and illustrated herein are directed to a utility vehicle having one or more omnidirectional wheels. The utility vehicles described herein may include a variety of different types of utility vehicles including, e.g., compact utility loaders, stand-on or walk-behind loaders (SOWB loaders), material haulers, mowers, etc. Further, the utility vehicles may include a boom for supporting and operating various attachments or working tools. Further, the vehicles described herein may include an omnidirectional wheel positioned to replace a conventional wheel of the vehicle. The omnidirectional wheel may include a body portion and a plurality of rollers. The body portion may be adapted to rotate relative to the vehicle about a wheel axis and each of the plurality of rollers may be adapted to rotate relative to the body portion about a corresponding roller axis that is different than the wheel axis. The omnidirectional wheel may assist in turning the vehicle (e.g., movement other than forward or backward). For example, the discs or rollers may be positioned around the circumference of the wheel and adapted to rotate about a roller axis that is perpendicular to the wheel axis. In other words, the omnidirectional wheel as a whole may rotate about a wheel axis, but each of the discs or rollers may rotate about its own roller axis (which may be different for each roller) that is perpendicular to the wheel axis. Specifically, in one or more embodiments, the omnidirectional wheel may be adapted to rotate about the wheel axis to move the vehicle in a forward and backward direction, while the discs or rollers may be adapted to rotate about the roller axis to move the vehicle in a left and right direction. Therefore, the presence of the discs or rollers may assist with the vehicle turning left or right by providing an axis of rotation that allows for left or right motion. As such, the omnidirectional wheel may reduce energy required to turn the vehicle as compared to non-omnidirectional wheels because, e.g., the roller of the omnidirectional wheel may rotate when moving in the lateral or sideways direction as compared to a non-omnidirectional wheel skidding when moving in the sideways direction. It is noted that, while shown using rollers having roller axes located in a plane perpendicular to the wheel axis, such a configuration is not limiting as roller having axes obliquely oriented (relative to the wheel axis), such as Mecanum wheels, are also contemplated herein.

The suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

With reference to the figures of the drawing, wherein like reference numerals designate like parts and assemblies throughout the several views, FIGS. 1A-1C illustrate a utility vehicle 100 in accordance with embodiments of the present disclosure. The vehicle 100 may be similar in some respects to the Dingo series utility loader sold by The Toro Company of Minneapolis, MN, USA. The vehicle 100 may accommodate a variety of working tools or attachments used, e.g., by landscape contractors and building construction/demolition operators, to perform various tasks. For example, a bucket can be attached to the vehicle 100 for scooping, carrying, and emptying (e.g., into a dump truck or refuse bin) dirt, demolition debris, or other material. The vehicle 100 may accommodate other tools including, for example, forks, a vibratory plow, a grapple rake, a trencher, a leveler, a box rake, a soil cultivator, a snowthrower, a stump grinder, a tiller, an auger, a plow blade, a backhoe, a cement bowl, a leveler, and a material or debris hauler, among others.

While utility vehicles 100 or compact utility loaders like those described herein may vary in size, in one or more embodiments, the vehicle may be of a size that permits the vehicle to access areas generally inaccessible by larger skid steer loaders (e.g., areas with confined entries such as gates, doorways/hallways, or areas unable to support the weight of a typical skid steer loader). Further, the exemplary vehicle 100 may be configured in a stand-on configuration using a platform 106 to accommodate a standing operator. In other embodiments, the platform 106 could be stowable so as not to interfere with walk-behind operation. One embodiment of such a stowable platform is shown in U.S. Pat. No. 7,980,569.

The vehicle 100 may include a suitably shaped chassis or frame 102 on which a prime mover 104, such as one or more electric motors or internal combustion engines, is carried. A hood or shroud may at least partially enclose the prime mover 104. The frame may include a front end 121 and a rear end 123 spaced apart along a longitudinal axis 101 of the vehicle 100. Further, the frame 102 may include left and right sides 124, 126 spaced apart along a transverse axis 125. The frame 102 may include laterally spaced uprights 108 (left and right uprights **108*a*, 108*b*** positioned on each (left and right) side of the vehicle).

The frame 102 may support a boom that includes a lift arm assembly 110 that may be operatively attached to the frame 102. For example, the lift arm assembly 110 may pivotally (e.g., at a rear end of the lift arm assembly 110) be connected to the uprights 108 of the frame 102 and extend generally forward of the front end 121 of the vehicle 100. In some embodiments, the lift arm assembly 110 may include left and right lift arm assemblies **110*a*, 110*b* that are each pivotally connected to the left and right sides or uprights 108*a*, 108*b* of the frame, respectively (although units having a single lift arm assembly are also contemplated). A lift actuator 112, e.g., hydraulic cylinder (cylinder 112*a* visible in FIG. 1A and cylinder 112*b* in FIG. 1B), may be connected between the frame 102 and each lift arm assembly 110 (110*a*, 110*b*). When piston rods of the lift actuators 112 are extended, the lift arm assemblies 110 may pivot about a transverse lift arm pivot axis to raise or lift the front ends of the lift arm assemblies 110 relative to the ground surface 103/frame 102. Likewise, when the piston rods of the lift actuators 112 are retracted, the lift arm assemblies 110 may pivot in the opposite direction about the transverse lift arm pivot axis to lower the front ends of the lift arm assemblies 110**.

In the embodiments described and illustrated herein, the various actuators (e.g., the lift actuators 112 and tilt actuators 107 (described below)) may be configured as hydraulic cylinders. However, the term "actuator," as used herein, may refer to most any electric, hydraulic, or pneumatic device capable of providing movement of one element relative to another. For example, a linear electric actuator, or a hydraulic or electric rotary motor driving a pinion in a rack-and-pinion system, may be utilized in place of the hydraulic cylinders described herein without departing from the scope of this disclosure.

The vehicle 100 may further include a traction system that includes ground engaging members 114 operatively attached to the frame 102 and carrying the frame 102 above the ground surface 103. For example, the ground engaging members 114 may include conventional wheels 130 and omnidirectional wheels 140. As used herein, the term "conventional wheel" is understood to include not only conventional pneumatic tire-and-wheel combinations, but also tireless wheels (e.g., where the wheel is designed to directly engage the ground surface), and "airless" tires such as those sold under the tradename "Tweel" (sold by Michelin of Clermont-Ferrand, France) and "Tractus" (sold by Exmark Manufacturing Co., Inc. of Beatrice, Nebraska, USA). Also, the term "omnidirectional wheel" is understood to include wheels that include a plurality of discs or rollers 142 (e.g., positioned along a circumference of the wheel) that are adapted to rotate about an axis that is different than an axis about which the wheel rotates relative to the utility vehicle 100 (e.g., as will be discussed further herein). Other terms used to describe omnidirectional wheels 140 may include poly wheels or Mecanum wheels.

The omnidirectional wheels 140 may be used to assist in turning the utility vehicle 100 (e.g., turning faster or more directly). Also, the omnidirectional wheels 140 may reduce power consumption attributed to turning the utility vehicle 100 due to the multidirectional characteristics of the omnidirectional wheels 140. For example, because the omnidirectional wheels 140 include discs or rollers 142 adapted to rotate about an axis 144 that allows for sideways wheel movement, less friction is created during turns (e.g., as compared to a non-omnidirectional wheel that may skid or slide during turns). A reduction of power consumption is particularly relevant for battery power (e.g., electric) vehicles. For example, it may be disadvantageous to replace or recharge a battery to continue operating the vehicle (e.g., due to the additional time required to do so) and, therefore, energy conservation/extended run time may be valuable vehicle characteristics.

The omnidirectional wheels 140 may be positioned on the utility vehicle 100 to optimize the benefit provided thereby while still maintaining control of the vehicle 100. In other words, if all of the ground engaging members 114 were all conventionally-constructed omnidirectional wheels 140, the vehicle 100 could be susceptible, in some circumstances, to unintended sideways drift (e.g., if the vehicle 100 were sitting sideways on an incline). However, with embodiments of the present disclosure, one or more (e.g., two) of the ground engaging members 114 are configured as conventional wheels 130 (e.g., non-omnidirectional wheels). As a result, the static friction provided by such conventional wheel 130 reduces such unintended sideways movement. Accordingly, the vehicle 100 may have the benefit of improved turning and increased energy conservation, without negatively impacting vehicle stability, by combining omnidirectional wheels 140 and conventional wheels 130 on the vehicle 100.

In one or more embodiments, the ground engaging members 114 may include an omnidirectional wheel 140 and a conventional wheel 130 nearest the rear end 123 of the frame 102 (e.g., closer to the rear end 123 than the front end 121) and on opposite sides of the frame 102. For example, in some embodiments, a rear omnidirectional wheel 140 may be positioned on the left side 124 of the frame 102 nearest the rear end 123 of the frame 102 and the conventional wheel 130 may be positioned on the right side 126 of the frame 102 nearest the rear end 123 of the frame 102. In other embodiments (e.g., as shown in FIGS. 1A-1C), the omnidirectional wheel 140 may be positioned on the right side 126 of the frame 102 nearest the rear end 123 of the frame 102 and the conventional wheel 130 may be positioned on the left side 124 of the frame 102 nearest the rear end 123 of the frame 102. In other words, at the rear end 123 of the frame 102, an omnidirectional wheel 140 and a conventional wheel 130 may be positioned opposite one another. In one or more embodiments, an additional omnidirectional wheel (e.g., front omnidirectional wheel 140) may be positioned nearest the front end 121 of the frame 102 and on an opposite side of the frame 102 from the rear omnidirectional wheel 140.

In other embodiments, the ground engaging members 114 may include an omnidirectional wheel 140 and a conventional wheel 130 nearest the front end 121 of the frame 102 on opposite sides of the frame 102. For example, in some embodiments (e.g., as shown in FIGS. 1A-1C), the omnidirectional wheel 140 may be positioned on the left side 124 of the frame 102 nearest the front end 121 of the frame 102 and the conventional wheel 130 may be positioned on the right side 126 of the frame 102 nearest the front end 121 of the frame 102. In other embodiments, the omnidirectional wheel 140 may be positioned on the right side 126 of the frame 102 nearest the front end 121 of the frame 102 and the conventional wheel 130 may be positioned on the left side 124 of the frame 102 nearest the front end 121 of the frame 102. In other words, at the front end 121 of the frame 102, an omnidirectional wheel 140 and a conventional wheel 130 may be positioned opposite one another to provide desirable turning benefits. In one or more embodiments, an additional omnidirectional wheel may be positioned nearest the rear end 123 of the frame 102 and on an opposite side of the frame 102 from the omnidirectional wheel 140.

Furthermore, in one or more embodiments, the ground engaging members 114 may include two omnidirectional wheels and two conventional wheels. It is noted that in some embodiments (four wheeled vehicle), the ground engaging members 114 may include exactly two omnidirectional wheels 140 and exactly two conventional wheels 130. The two omnidirectional wheels 140 may be positioned opposite one another longitudinally and transversely (e.g., diagonal from one another). For example, the two omnidirectional wheels 140 may include a first omnidirectional wheel positioned nearest the front end 121 of the frame 102 and either the left or right side 124, 126 of the frame 102 and a second omnidirectional wheel positioned nearest the rear end 123 of the frame 102 and the other of the left or right side 124, 126 of the frame 102. Specifically, as shown in FIGS. 1A-1C, a first omnidirectional wheel 140 is positioned nearest the front end 121 of the frame 102 on the left side 124 of the frame 102 and a second omnidirectional wheel 140 is positioned nearest the rear end 123 of the frame 102 on the right side 126 of the frame 102.

Positioning the omnidirectional wheels 140 diagonal from one another balances the benefits between the front/rear ends 121, 123 and the left/right sides 124, 126. In other words, the omnidirectional wheels 140 may not be positioned only at, e.g., the front end 121 of the vehicle 100 (e.g., on either of left and right sides), the rear end 123 of the vehicle 100 (e.g., on either of left and right sides), the left side 124 of the vehicle 100 (e.g., at the front and rear of the vehicle), or the right side 126 of the vehicle 100 (e.g., at the front and rear of the vehicle).

For example, the diagonal configuration of the omnidirectional wheels 140 may result in decreased power consumption during turning the vehicle 100. Specifically, there may be a reduction in amps used to accomplish the turn with omnidirectional wheels 140 on the vehicle 100 as compared to a conventional wheel replacing the omnidirectional wheel.

Figure 2A:
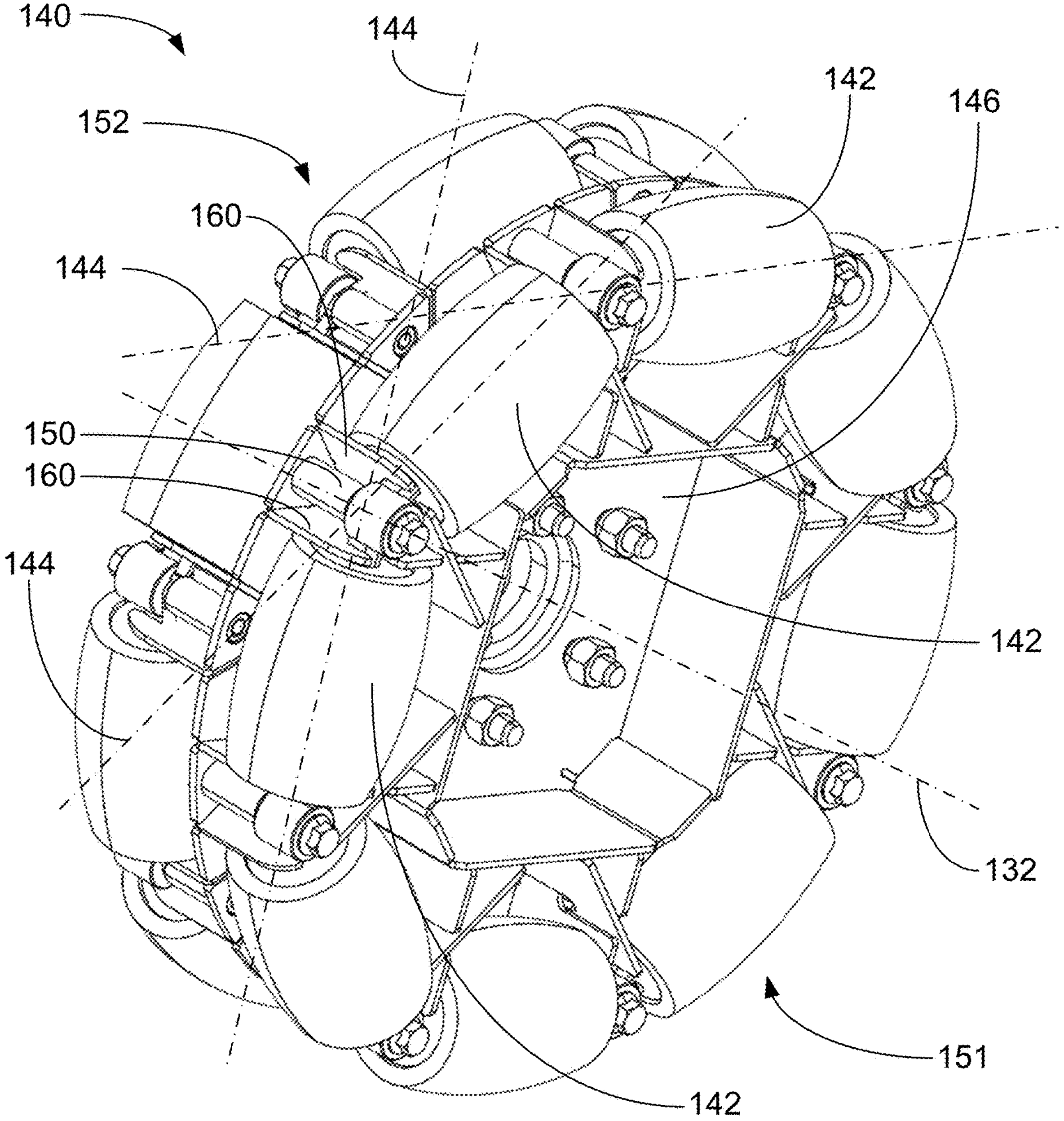
FIG. 2A is a perspective view of an isolated omnidirectional wheel in accordance with one embodiment of this disclosure.
Figure 2B:
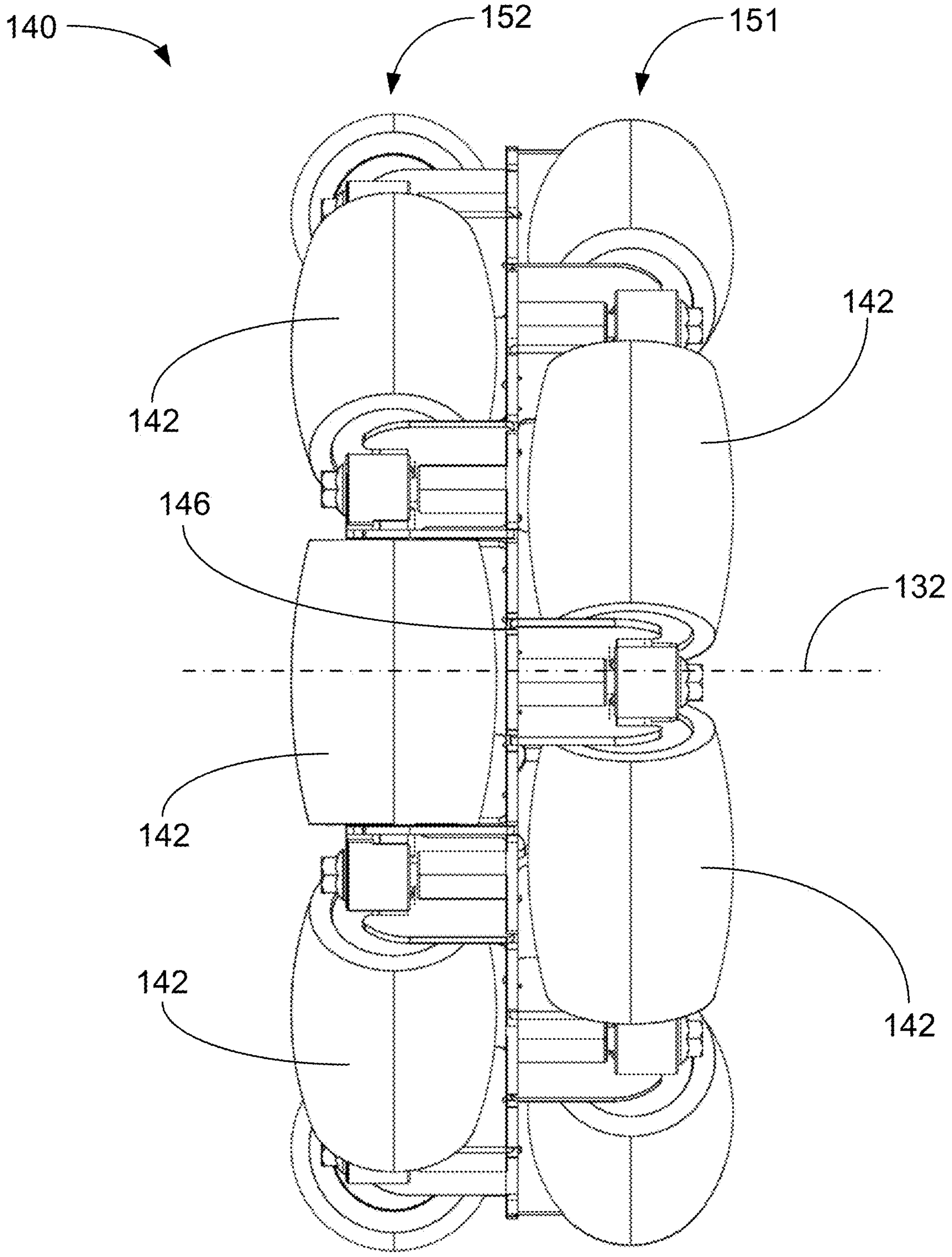
FIG. 2B is a front view of the omnidirectional wheel of FIG. 2A.
Figure 2C:
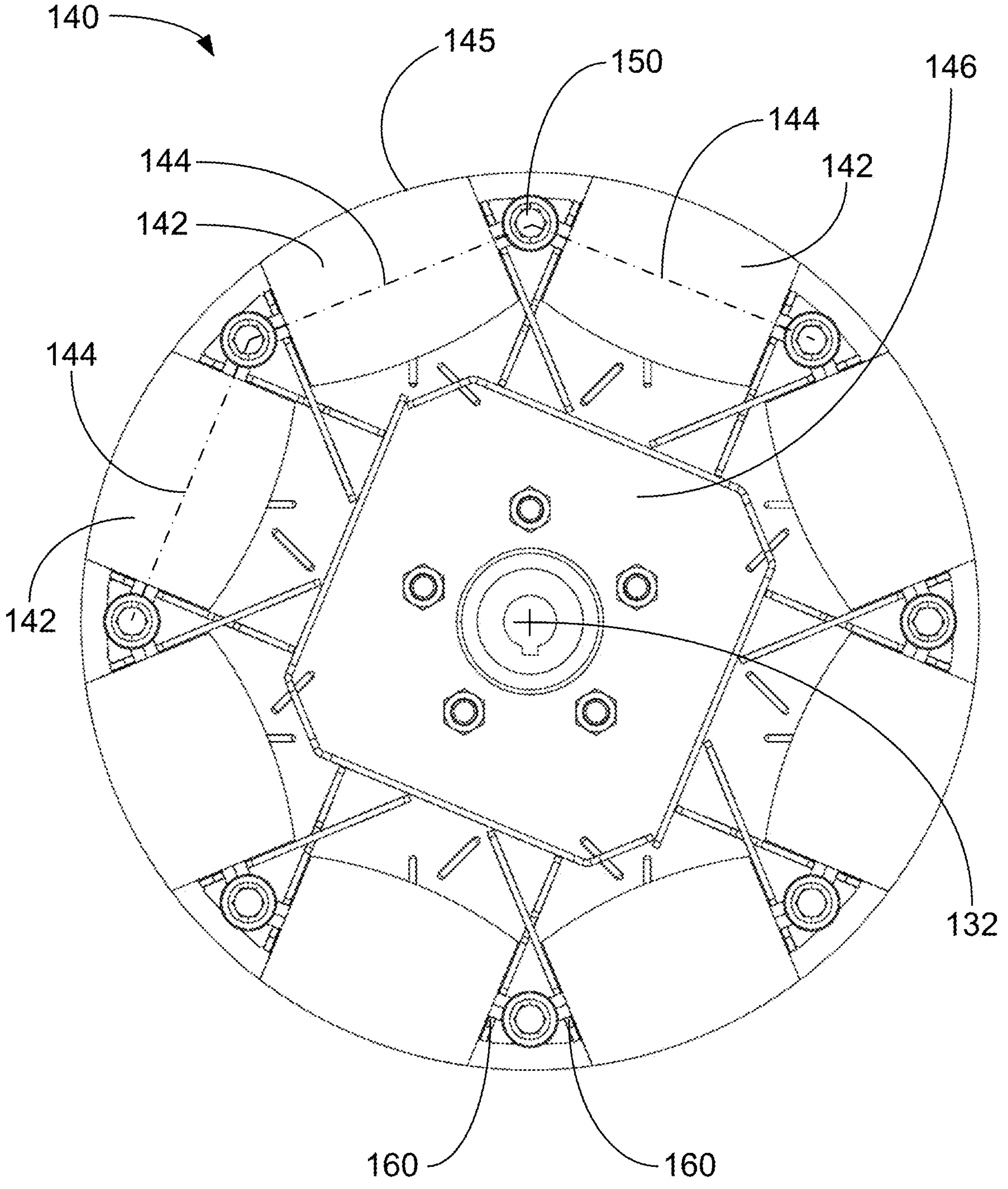
FIG. 2C is a side elevation view of the omnidirectional wheel of FIG. 2A.

An exemplary omnidirectional wheel 140 is shown isolated from the vehicle 100 in FIGS. 2A-2C. The omnidirectional wheel 140 may include a body portion 146 and a plurality of rollers 142. The body portion 146 may be adapted to rotate relative to the frame 102 about a wheel axis 132. In other words, the body portion 146 of the omnidirectional wheel 140 is adapted to rotate relative to the frame 102 similar to a conventional wheel 130. The body portion 146 of the omnidirectional wheel 140 may include (e.g., be formed of) any suitable material such as, e.g., rubber, plastic (e.g., molded plastic or composite), steel (e.g., welded sheet, plate steel, stamped steel, etc.), etc. Specifically, the body portion 146 may include a plurality of axle hubs 150 that hold the axle of two adjacent rollers 142. For example, the axle hubs 150 may be adapted to receive the axles of the adjacent rollers 142 so that the rollers 142 can rotate about their two independent roller axes 144 (e.g., at two different angles). In other words, each end of each roller axle shares an axle hub 150 with another roller axle, and the axle hub 150 maintains the independent roller axes 144. Additionally, the body portion 146 may include two plates 160 that intersect (e.g., through notches in each of the plates 160) and each plate 160 guides the axle of a corresponding adjacent roller 142.

The plurality of rollers 142 may be arranged around the circumference of the omnidirectional wheel 140 to form a discontinuous surface upon which the omnidirectional wheel 140 engages the ground surface 103. For example, an outer surface 145 of each roller of the plurality of rollers 142 may define a circular profile having a center coincident with the wheel axis 132 (e.g., as shown in FIG. 2C). In other words, each roller 142 may define an arcuate shape that is widest at the middle of the roller and narrows towards each end of the roller 142. Specifically, the curvature of the rollers 142 may match the radius of the entire wheel. Further, each roller of the plurality of rollers 142 may define substantially similar dimensions. Additionally, the plurality of rollers 142 may include any suitable number of rollers (e.g., three rollers, four rollers, five rollers, six rollers, eight rollers, ten rollers, twelve rollers, fourteen rollers, etc.). As shown in FIGS. 2A-2C, the plurality of rollers 142 of the omnidirectional wheel 140 includes sixteen rollers (e.g., eight within each plane as will be described further herein).

Each roller of the plurality of rollers 142 may be adapted to rotate relative to the body portion 146 about its own independent roller axis 144 (e.g., as shown in FIGS. 2A and 2C). In other words, each roller 142 may rotate about its own roller axis 144 (e.g., a roller axle or rod extending along the roller axis 144) that is separate from the others. For example, if the omnidirectional wheel 140 includes sixteen rollers, then there are sixteen different roller axes 144 (e.g., one for each roller). Further, the roller axes 144 may lie within a plane that is perpendicular to the wheel axis 132 (e.g., the wheel axis 132 is extending into the page in FIG. 2C) of the omnidirectional wheel 140. In other words, each roller axis 144 (e.g., when projected to be parallel to the roller axis 144 and intersect with the wheel axis 132) may extend perpendicular to the wheel axis 132. However, other roller axis configurations are certainly possible without departing from the scope of this disclosure (e.g., roller axes 144 that are non-perpendicular to the wheel axis 132).

In one or more embodiments, for example as shown in FIGS. 2A and 2B, the plurality of rollers 142 may include a first set of rollers 151 and a second set of rollers 152. The first set of rollers 151 may be positioned such that the roller axes 144 of the first set of rollers 151 are within a first plane and the second set of rollers 152 are positioned such that the roller axes 144 of the second set of rollers 152 are within a second plane that is parallel to and spaced away from the first plane. In other words, the first set of rollers 151 may be transversely offset from the second set of rollers 152. In other words, each roller 142 from the first set of rollers 151 may be positioned between a pair of adjacent rollers from the second set of rollers 152. The offset pair of rollers may help provide more continuous contact between the rollers 142 and the ground surface 103 during operation. In one or more embodiments, the plurality of rollers 142 may include a third (or more) set of rollers.

The ground engaging members 114 may be positioned on a ground surface 103 that may include turf or a hard surface (e.g., concrete). In other words, the omnidirectional wheels 140 may be utilized regardless of the type of ground surface 103 to help assist in turns and reduce energy consumption during turns.

At least one of the ground engaging members 114 may be powered by the prime mover 104 to propel the frame 102 over the ground surface 103. For example, the powered ground engaging members may act as drive members that may be coupled for powered rotation relative to the frame 102 to propel the frame 102 relative to the ground surface 103. None, any, or all of the conventional wheels 130 and/or the omnidirectional wheels 140 may be drive members. For example, in one or more embodiments, the ground engaging members 114 nearest the front end 121 of the frame 102 may be drive members and/or the ground engaging members 114 nearest the rear end 123 of the frame 102 may be drive members. As such, some configurations may utilize an all-wheel-drive arrangement. For example, each ground engaging member 114 may be connected to its own independent drive unit (e.g., hydraulic motor powered by the prime mover) or separate electric motors to propel the vehicle 100 over the ground surface 103. Each motor may rotate its respective drive member in either a forward or reverse direction to permit corresponding propulsion of the vehicle 100 forwardly or rearwardly. Also, having an independent drive unit in each ground engaging member 114 may allow for certain types of turns based on the rotational direction of each wheel. Therefore, steering control of the vehicle 100 may be achieved by varying the relative rotational speed and direction of each drive member.

With reference again to FIGS. 1A-1C, the vehicle 100 may further include a control console 120 that, in the illustrated embodiment, is located at or near the rear end 123 of the vehicle 100 (e.g., at or near the rear end of the frame 102) proximate the upper ends of the uprights 108. The control console 120 may include various controls, e.g., levers, switches, buttons, joysticks, etc., that control vehicle operation. For example, the control console 120 may include controls that cause various actuators to energize (e.g., cause lift actuators 112 to extend and thus pivot the lift arm assemblies 110 to various positions). In addition, the control console 120 may include a movable drive control handle to allow operator control of the traction system that drives the ground engaging members 114. The controls on the control console 120 may be adapted to be manipulated by an operator either: standing on a platform mounted near the rear end of the frame, or walking behind the frame. The controls may include dual levers or a joystick to control the forward and reverse movement of the vehicle, as well as turning (e.g., by actuating the dual levers to differing degrees or twisting the joystick).

In one or more embodiments, the vehicle 100 may be controlled remotely or autonomously. For example, the vehicle 100 may not have an operator directly engaged with the vehicle 100, but may instead be controlling the vehicle 100 from a distance. Also, for example, the vehicle 100 may be autonomously controlled using sensors and programming (e.g., artificial intelligence) to accomplish tasks without direct control from an operator.

As mentioned above, a tool assembly (e.g., a working tool) may be connected to a mounting structure, e.g., attachment plate 122, pivotally connected to front or distal ends of the lift arm assemblies 110. To ease the task of removing and installing tools on the attachment plate 122, various quick attachment systems may be used as are known in the art. Such attachment plates may conform to industry standards such as SAE J2513 (2000).

In some embodiments, the attachment plate 122 is pivotally connected to the front ends of the lift arm assemblies (e.g., at a transverse pivot joint/axis) so that an orientation (e.g., angle of inclination) of the attachment plate (and thus the tool itself) may be adjusted as the lift arm assemblies are raised and lowered. Tilt actuator 107 may extend between the attachment plate 122 and a support between the lift arm assemblies 110. As the tilt actuators 107 extend and retract, the angle of inclination of the attachment plate (about the pivot axis and relative to lift arm assemblies) may change. Thus, by controlling the vertical position of the lift arm assemblies 110 (via the lift actuators 112), and by controlling the angle of inclination of the attachment plate 122 (via the tilt actuator 107) relative to the lift arm assemblies, the operator may position the tool within a wide range of elevations and inclinations. While shown as utilizing one tilt actuator 107, other embodiments may use two or more tilt actuators without departing from the scope of this disclosure.

During operation, the operator may stand upon the platform 106 or, in other embodiments, walk behind the frame 102. The control console 120 may be positioned at a convenient height so that it remains accessible to the operator from this standing position. In combination with the forward location of the lift arm assembly, the utility vehicle may provide the operator with desirable sight lines to both the tool area and the areas immediately surrounding the operator.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A utility vehicle comprising:

a frame carrying a prime mover, the frame comprising a front end and a rear end spaced apart along a longitudinal axis of the utility vehicle, the frame further comprising left and right sides spaced apart along a transverse axis;

ground engaging members operatively attached to the frame and carrying the frame above a ground surface, wherein the ground engaging members comprise two omnidirectional wheels and two conventional wheels, wherein the two omnidirectional wheels are positioned opposite one another relative to the longitudinal axis and relative to the transverse axis, wherein a first one of the two omnidirectional wheels is positioned opposite a first one of the two conventional wheels relative to the longitudinal axis, wherein the first one of the two omnidirectional wheels and the first one of the two conventional wheels are positioned at the rear end of the frame, wherein at least one of the two omnidirectional wheels and at least one of the two conventional wheels are powered by the prime mover to propel the frame over the ground surface, wherein each omnidirectional wheel of the two omnidirectional wheels comprises a body portion and a plurality of rollers, wherein the body portion is adapted to rotate relative to the frame about a wheel axis, and wherein each roller of the plurality of rollers is adapted to rotate relative to the body portion about a roller axis, wherein the roller axis of each roller is separate from one another;

a lift arm assembly operatively attached to the frame; and a tool assembly carried on a front end of the lift arm assembly.

2. The utility vehicle of claim 1, wherein the plurality of rollers comprises a first set of rollers and a second set of rollers, wherein the first set of rollers are positioned such that the roller axes of the first set of rollers are within a first plane and the second set of rollers are positioned such that the roller axes of the second set of rollers are within a second plane that is parallel to and spaced away from the first plane.

3. The utility vehicle of claim 1, wherein an outer surface of each roller of the plurality of rollers defines a circular profile having a center at the wheel axis.

4. The utility vehicle of claim 1, wherein each roller of the plurality of rollers defines substantially similar dimensions.

5. The utility vehicle of claim 1, wherein the roller axis for each roller of the plurality of rollers is perpendicular to the wheel axis.

6. The utility vehicle of claim 1, wherein each of the two omnidirectional wheels is powered by the prime mover to propel the frame over the ground surface.

7. A utility vehicle comprising:

a frame carrying a prime mover, the frame comprising a front end and a rear end spaced apart along a longitudinal axis of the utility vehicle, the frame further comprising left and right sides spaced apart along a transverse axis;

ground engaging members operatively attached to the frame and carrying the frame above a ground surface, wherein the ground engaging members comprise an omnidirectional wheel and a conventional wheel, both nearest the rear end of the frame on opposite sides of the frame relative to the longitudinal axis, wherein the omnidirectional wheel and the conventional wheel are powered by the prime mover to propel the frame over the ground surface, wherein the omnidirectional wheel comprises a body portion and a plurality of rollers, wherein the body portion is adapted to rotate relative to the frame about a wheel axis, and wherein each roller of the plurality of rollers is adapted to rotate relative to the body portion about a roller axis, wherein the roller axis of each roller is separate from one another;

a lift arm assembly operatively attached to the frame; and a tool assembly carried on a front end of the lift arm assembly.

8. The utility vehicle of claim 7, wherein the omnidirectional wheel is positioned on the left side of the frame.

9. The utility vehicle of claim 7, wherein the omnidirectional wheel is positioned on the right side of the frame.

10. The utility vehicle of claim 7, wherein the ground engaging members further comprise an additional omnidirectional wheel positioned nearest the front end of the frame and on an opposite side of the frame from the omnidirectional wheel.

11. The utility vehicle of claim 7, wherein the plurality of rollers comprises a first set of rollers and a second set of rollers, wherein the first set of rollers are positioned such that the roller axes of the first set of rollers are within a first plane and the second set of rollers are positioned such that the roller axes of the second set of rollers are within a second plane that is parallel to and spaced away from the first plane.

12. The utility vehicle of claim 7, wherein an outer surface of each roller of the plurality of rollers defines a circular profile having a center at the wheel axis.

13. The utility vehicle of claim 7, wherein each roller of the plurality of rollers defines substantially similar dimensions.

14. The utility vehicle of claim 7, wherein the roller axis for each roller of the plurality of rollers is perpendicular to the wheel axis.

15. A utility vehicle comprising:

a frame carrying a prime mover, the frame comprising a front end and a rear end spaced apart along a longitudinal axis of the utility vehicle, the frame further comprising left and right sides spaced apart along a transverse axis;

ground engaging members operatively attached to the frame and carrying the frame above a ground surface, wherein the ground engaging members comprise an omnidirectional wheel and a conventional wheel, both nearest the front end of the frame on opposite sides of the frame relative to the longitudinal axis, wherein the omnidirectional wheel and the conventional wheel are powered by the prime mover to propel the frame over the ground surface, wherein the omnidirectional wheel comprises a body portion and a plurality of rollers, wherein the body portion is adapted to rotate relative to the frame about a wheel axis, and wherein each roller of the plurality of rollers is adapted to rotate relative to the body portion about a roller axis, wherein the roller axis of each roller is separate from one another;

a lift arm assembly operatively attached to the frame; and a tool assembly carried on a front end of the lift arm assembly.

16. The utility vehicle of claim 15, wherein the ground engaging members further comprise an additional omnidirectional wheel positioned nearest the rear end of the frame and on an opposite side of the frame from the omnidirectional wheel.

17. The utility vehicle of claim 15, wherein the plurality of rollers comprises a first set of rollers and a second set of rollers, wherein the first set of rollers are positioned such that the roller axes of the first set of rollers are within a first plane and the second set of rollers are positioned such that the roller axes of the second set of rollers are within a second plane that is parallel to and spaced away from the first plane.

18. The utility vehicle of claim 15, wherein an outer surface of each roller of the plurality of rollers defines a circular profile having a center at the wheel axis.

19. The utility vehicle of claim 15, wherein each roller of the plurality of rollers defines substantially similar dimensions.

20. The utility vehicle of claim 15, wherein the roller axis for each roller of the plurality of rollers is perpendicular to the wheel axis.

* * * * *